United States Patent [19]
Matthews

[11] Patent Number: 5,631,741
[45] Date of Patent: May 20, 1997

[54] ELECTRONIC CARBON PAPER

[75] Inventor: Walter S. Matthews, Folsom, Calif.

[73] Assignee: Intel Corporation, Santa Clara, Calif.

[21] Appl. No.: 581,279

[22] Filed: Dec. 29, 1995

[51] Int. Cl.⁶ .............................. H04N 1/00; B41B 1/61
[52] U.S. Cl. .................. 358/296; 358/401; 178/18; 345/173
[58] Field of Search ............................ 358/296, 401, 358/444, 452, 500, 75–80; 345/156, 173; 380/22–24, 9, 43, 49, 55; 178/18–20; 355/2; 395/155, 161; 382/119–123, 232, 3

[56] References Cited

U.S. PATENT DOCUMENTS

| | | | |
|---|---|---|---|
| 4,514,818 | 4/1985 | Walker | 364/521 |
| 4,622,437 | 11/1986 | Bloom et al. | 178/18 |
| 4,827,084 | 5/1989 | Yaniv et al. | 178/18 |
| 5,195,133 | 3/1993 | Kapp et al. | 380/9 |
| 5,202,930 | 4/1993 | Livshitz et al. | 382/3 |
| 5,276,510 | 1/1994 | Cok et al. | 358/500 |
| 5,387,986 | 2/1995 | Gerhart et al. | 358/452 |
| 5,544,255 | 8/1996 | Smithies et al. | 382/119 |
| 5,548,414 | 8/1996 | Sugano et al. | 358/452 |

Primary Examiner—Peter S. Wong
Assistant Examiner—Gregory J. Toatley, Jr.
Attorney, Agent, or Firm—Blakely, Sokoloff, Taylor & Zafman

[57] ABSTRACT

An electronic copying apparatus provides a touch sensitive area placed under a paper on which an image is produced. Pressure on the touch sensitive area produced in rendering the image on the paper generates signals which are detected by a processor and stored as a series of pixel positions in a non-volatile solid-state memory array such as a flash EEPROM memory array. The image stored in the memory array may be read from the array by a computer and utilized as are other files in a computer.

19 Claims, 1 Drawing Sheet

5,631,741

ELECTRONIC CARBON PAPER

BACKGROUND OF THE INVENTION

1. Field Of The Invention

This invention relates to electronic systems and, more particularly, to methods and apparatus for providing a portable electronic device for recording copies of images drawn on paper.

2. History Of The Prior Art

Although there have been many attempts to provide portable electronic devices for taking notes, recording data, and sketching figures which may be utilized electronically, all devices known to date are relatively expensive and require that new techniques be learned in order to allow their use. So called personal digital assistants (PDAs) find few buyers because of their high cost and limited usefulness. In fact, the cost of such devices and the difficulty of learning their varied operation has precluded the wide acceptance of these devices. Some people would refuse to use such devices even were they to be sold at reasonable prices, preferring instead to use paper for sketching and note taking. The refusal of such people to use these electronic devices means that the notes and sketches cannot easily be accessed by the various electronic techniques which are available except by the expensive and labor intensive technique of scanning.

It is desirable to be able to record copies of images produced on plane paper electronically so that various electronic processes for manipulating those images may be utilized.

SUMMARY OF THE INVENTION

It is, therefore, an object of the present invention to provide apparatus and a method for making inexpensive copies of images recorded on plain paper as those images are recorded.

This and other objects of the present invention are realized by an electronic device which uses a touch sensitive area placed under a paper on which an image is produced. Pressure on the touch sensitive area produced in rendering the image on the paper generates signals which are detected by a processor and stored as a series of pixel positions in a memory array such as a flash EEPROM memory array. The image stored in the memory array may be read from the array by a computer and utilized as are other files in a computer.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
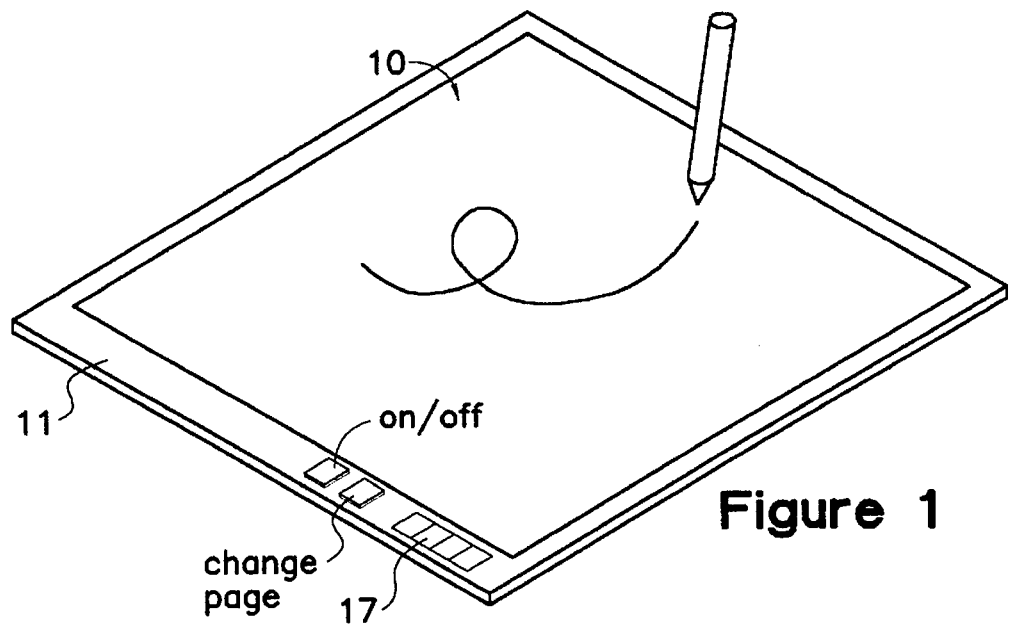
FIG. 1 is a perspective diagram of an electronic copying device designed in accordance with the present invention.

Referring now to FIG. 1, there is illustrated a block diagram of apparatus constructed in accordance with the present invention. The invention includes a flat touch sensitive surface 10. The touch sensitive surface 10 may be supported on its back side and hermetically enclosed by a thin flexible plastic material 11. The material 11 may be used as well to support embedded circuitry which is described hereinafter. Such a surface 10 and associated circuitry may be the size of a sheet of paper (e.g., 8.5×11 inches) and approximately one-fourth as thick as a typical PCMCIA card.

Figure 2:
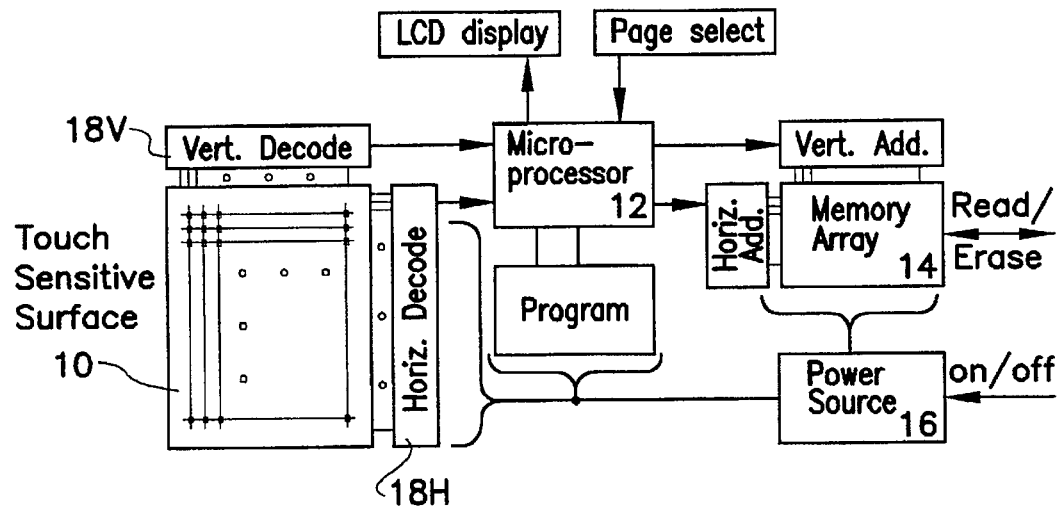
FIG. 2 is a block diagram of a digital system designed in accordance with the present invention.

The surface 10 may be constructed of any of the generally available touch sensitive materials known to those skilled in the art. For example, resistive or capacitive elements (other touch sensitive surfaces may be utilized) may be placed at selected intervals in rows and columns, as shown in FIG. 2, to join to a first plurality of parallel conductors running in a first direction and a second plurality of parallel conductors running in a second direction perpendicular to the first direction. For example, the intervals may be such that a typical 800×600 array representing 480,000 pixel positions is provided. The elements connected to the conductors may be designed to respond to pressure at a selected level to provide a signal on the conductors intersecting any point on the surface which may be detected on the conductors. The signals on the conductors may be detected as they are generated; and the addresses indicated by the signals decoded by decoding circuitry 18H and 18V and read by a microprocessor or microcontroller 12 in a manner known to those skilled in the art. Once the address is known, each entry may be written to a predetermined position of a memory array 14. In one embodiment, a memory array 14 having a number of flash memory devices equal in number to the number of intersections and positioned in similar rows and columns may be utilized to store the data indicating pressure at particular positions on the surface 10. In this embodiment, each position on the touch sensitive surface 10 is recorded in one unique position having an identical address in the memory array. As will be seen, more complicated addressing may be utilized such as vector graphic representation. A vector graphic representation utilizes an algorithm which identifies a first arbitrary position at which some mark begins and includes an equation which represents velocity, change of direction from the point, and the rate of change of direction from the point. Such a representation typically uses less memory than a bitmapped representation.

A flash EEPROM memory array is used in one embodiment of the invention. A flash EEPROM memory array is constructed of a large plurality of floating-gate metal-oxide-silicon field effect transistor devices arranged as memory cells in typical row and column fashion with circuitry for accessing individual cells and placing the memory transistors of those cells in different memory conditions. Such memory transistors may be programmed by storing a charge on the floating gate. This charge remains when power is removed from the array. The charge level may be detected by interrogating the devices. A flash EEPROM memory array is especially useful because it allows a device designed in accordance with the invention to sustain complete loss of battery and still maintain the data written.

Each of the components including the surface 10, the microprocessor 12, and the memory array 14 may be powered by a source of voltage such as a battery 16. This allows the apparatus to be entirely portable.

The microprocessor 12 may run a program stored in firmware or read only memory which causes the microprocessor to read the data decoded from the touch sensitive surface and write that data to the flash array. In a more complicated device where expense is not a problem, a software program may be provided to allow the data to be read and written to the display. A piece of paper (or other material or nothing) may be placed on the touch screen surface, and some form of marker such as a pencil used to write on the paper. Pressure greater than some threshold pressure of the marker on the paper will be sensed by the touch sensitive elements of the touch sensitive surface 10 as the marker moves across the paper. Since the position of a marker pressing on paper placed on the touch screen surface will be sensed by the touch sensitive surface 10, the data in the memory array 14 then is effectively a copy on the data described on the surface of the paper. This data may be transferred to a typical computer through any of a number of well known means. For example, an output terminal may be provided from which the data in the memory array may be read and which may be used for erasing the memory array. Alternatively, infrared transfer means or similar transfer means may be employed to transfer the data in the flash array to a computer in which it may be manipulated in any of the manners well known to the prior art.

In one embodiment of the device, an output display 17 is provided by which an operator may determine the state of operation of the device. For example, the display may be a single 8×8 liquid crystal diode (LCD) display which indicates one value when the device is operating to store data in the flash array. A larger LCD display may be used with a large flash array to indicate the page number which is presently being written. In this manner, a flash array of a relatively standard size (e.g., eight megabytes) may be utilized to store a large number of pages of data. If, for example, a surface of 8.5 inches by 11 inches is utilized with a number of pixel positions equivalent to a 800×600 display and the surface is associated with an eight megabyte memory array, then over one hundred pages of 8.5×11 notes may be stored in the flash array. A device which is capable of storing more than one page, of course, requires addressing circuitry capable of addressing a plurality of pages each of which is capable of storing the number of positions which may be detected on the touch sensitive surface. This may be as simple as an external switch which allows page selection by number, modifies the address of the array by the page number, and displays the page number on the LCD display 17.

Since floppy and hard disk drives, main memory, and output displays for presenting the image stored are not required by the device, the device may be essentially the size and thickness of the touch sensitive screen. The effect is that a user may carry a device having essentially the size and shape of a clip board with him, place sheets of paper on the device, and write on the sheets of paper. Such a device may even be equipped with a clip to secure the paper in place. The data written on each sheet will be recorded in the flash array as it is written and may be retrieved and manipulated at some later time in any convenient computer.

This allows those users unwilling to utilize PDAs to obtain at least some of the advantages of those devices without having to learn the use of those devices. It provides a very light device which may be easily carried. It eliminates the cost of those elements of the usual portable computer or PDA which are the most expensive, particularly the output screen, random access memory, disk drives, and the like. The basic costs of such a device is due only to the flash memory, the microprocessor, a simple LCD display, possibly a one or two element keyboard, a power supply, and circuitry for interconnecting the component elements and accessing the array.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An electronic copying apparatus comprising a touch sensitive surface having a plurality of positions, a non-volatile solid-state memory array having a number of storage positions at least equal to the plurality of positions of the touch sensitive surface, means for detecting signals generated by pressing on the touch sensitive surface and storing those signals as they are generated in the memory array, and means for accessing the signals stored in the memory array.

2. An electronic copying apparatus as claimed in claim 1 in which the means for detecting signals generated by pressing on the touch sensitive surface and storing those signals in the memory array comprises a microcontroller.

3. An electronic copying apparatus as claimed in claim 2 in which the means for detecting signals generated by pressing on the touch sensitive surface and storing those signals as they are generated in the memory array.

4. An electronic copying apparatus as claimed in claim 1 in which the means for detecting signals generated by pressing on the touch sensitive surface and storing those signals in the memory array comprises a microprocessor.

5. An electronic copying apparatus as claimed in claim 4 in which the means for detecting signals generated by pressing on the touch sensitive surface and storing those signals as they are generated in the memory array further comprises a computer program running on the microprocessor.

6. An electronic copying apparatus as claimed in claim 1 further comprising a display for indicating the status of operation of the copying apparatus.

7. An electronic copying apparatus as claimed in claim 6 in which the display for indicating the status of operation of the copying apparatus is a light emitting diode display.

8. An electronic copying apparatus as claimed in claim 6 in which the display for indicating the status of operation of the copying apparatus is connected to indicate that power is being furnished to the copying apparatus.

9. An electronic copying apparatus as claimed in claim 6 in which the display for indicating the status of operation of the copying apparatus is connected to indicate that a particular portion of the memory array is storing data.

10. An electronic copying apparatus as claimed in claim 6 in which the non-volatile solid-state memory array is comprised of flash EEPROM memory devices.

11. An electronic copying apparatus as claimed in claim 1 in which the means for accessing the signals stored in the memory array comprises a terminal for transferring signals between the apparatus and a computer external to the apparatus.

12. An electronic copying apparatus as claimed in claim 1 further comprising a thin plastic supporting the touch sensitive surface and enclosing the memory array, the means for detecting signals generated by pressing on the touch sensitive surface and storing those signals as they are generated in the memory array, and the means for accessing the signals stored in the memory array.

13. An electronic system for providing an electronic copy of an image comprising:

a generally-planar support for a surface upon which an image may be described using a writing instrument, the generally-planar support being divided into a plurality of positions in a prearranged pattern, means for sensing at each of the plurality of positions the presence of a writing instrument on any surface supported by the generally-planar support, a non-volatile solid-state memory array having a number of storage positions at least equal to the plurality of positions of the generally-planar support, and means for detecting signals generated by sensing the presence of a writing instrument at any of the plurality of positions of the generally-planar support and storing those signals as they are generated in the memory array as an accessable copy of the described image.

14. An electronic system as claimed in claim 13 in which the means for detecting signals generated by sensing the presence of a writing instrument at any of the plurality of positions of the generally-planar support and storing those signals as they are generated in the memory array as an accessable copy of the described image comprises a controller.

15. An electronic system as claimed in claim 14 in which the means for detecting signals generated by sensing the presence of a writing instrument at any of the plurality of positions of the generally-planar support and storing those signals as they are generated in the memory array as an accessable copy of the described image further comprises a computer program running on the controller.

16. An electronic system as claimed in claim 13 further comprising a display for indicating the status of operation of the copying apparatus.

17. An electronic system as claimed in claim 13 in which the non-volatile solid-state memory array is comprised of flash EEPROM memory devices.

18. A method of making an electronic copy of an image described on a drawing surface by a drawing instrument comprising the steps of:

sensing a plurality of positions of the drawing instrument while describing the image and generating a signal representing the position, and storing each signal generated in a memory cell of a non-volatile memory array having a number of memory cells at least as great as the plurality of positions possible where the signals may be accessed electronically.

19. A method as claimed in claim 18 in each signal is stored in a flash EEPROM memory cell.

* * * * *